Feb. 16, 1943.   W. H. KLOCKE   2,311,113
CLUTCH
Filed Jan. 17, 1940

INVENTOR.
WILLIAM H. KLOCKE
BY
ATTORNEYS.

Patented Feb. 16, 1943

2,311,113

UNITED STATES PATENT OFFICE 2,311,113

CLUTCH

William H. Klocke, Woodhaven, N. Y., assignor to The Cleveland Graphite Bronze Company, Cleveland, Ohio, a corporation of Ohio Application January 17, 1940, Serial No. 314,308

5 Claims. (Cl. 192—107)

This invention relates, as indicated, to clutches, but has reference more particularly to a friction unit for use in clutches of the type embodying a clutching member in the form of a pneumatic tire.

In clutches of the type in which a pneumatic tire cooperates with a metallic clutch member to effect a driving engagement, as disclosed, for example, in Fawick Patent No. 2,111,422, it has been proposed to secure, as by vulcanization to the rim of the tire, a multiplicity of circumferentially-spaced substantially rectangular metallic shoes having facings of a frictional material secured thereto, as by means of rivets.

When a facing or facings becomes worn and requires replacement, it becomes necessary, since such facings are permanently secured to the metallic shoes, to remove the shoes and facings as units. This requires removal of the tire from the clutch assembly and heating of the tire to enable the shoes to be removed, a laborious and time-consuming operation.

It is a primary object of the present invention to provide a friction unit for use in clutches of the character described, from which the friction facing can be removed without requiring removal of any portion of the unit from the tire and without requiring dismantling of the clutch or removal of the tire from the clutch assembly.

Another object of the invention is to provide a compact and rugged friction unit which is adapted to be air-cooled during usage thereof.

A further object of the invention is to provide a novel, readily removable friction facing.

To the accomplishment of the foregoing and related ends, said invention, then, consists of the means hereinafter fully described and particularly pointed out in the claims; the annexed drawing and the following description setting forth in detail one structure embodying the invention, such disclosed means constituting, however, but one of various structural forms in which the principle of the invention may be used.

Figure 1:
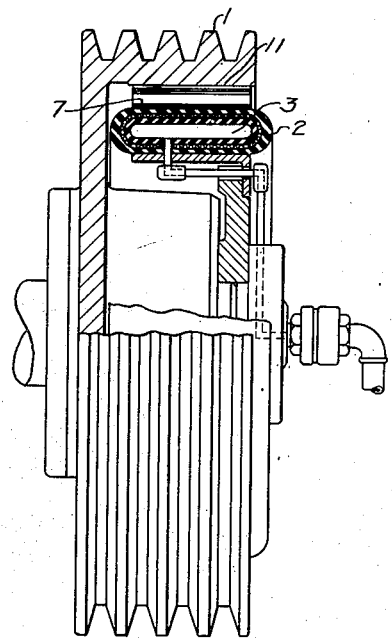
Fig. 1 is a view, partly in elevation, and partly in section, showing a clutch embodying the novel friction unit of the present invention.
Figure 2:
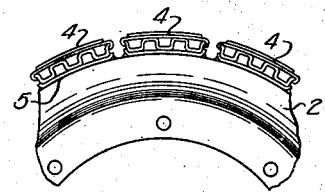
Fig. 2 is a fragmentary side elevation of the pneumatic tire of the clutch.
Figure 3:
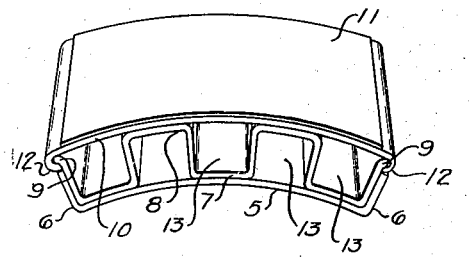
Fig. 3 is a perspective view of a preferred form of the friction unit.

Referring more particularly to Figs. 1, 2 and 3, there is shown a clutch embodying an annular metallic clutch member 1, and a pneumatic tire 2 having an air space 3, the tire being adapted to be brought into driving engagement with the inner surface of the member 1 by inflation of the inner tube.

The tread of the tire 2 is preferably smooth, and secured to said tread, as by vulcanization, is a multiplicity of circumferentially-spaced friction units, generally designated by reference numeral 4.

Each unit comprises a shoe 5, formed of sheet or strip steel, curved to conform with the curvature of the tire tread, and provided at its sides with upturned flanges 6, which extend transversely of the tire tread. Each shoe is secured, as by vulcanization, to the tire tread, and, in turn, has secured thereto, as by spot welding, an intermediate member 7 also formed of sheet steel or strip steel, and provided with corrugations 8 and outturned flanges 9, such corrugations and flanges also extending transversely of the tire tread.

The upper faces of the corrugations 8 are concentric with the shoe 5, and form a support for a friction member comprising a base portion 10, curved to conform with the corrugations 8, and a facing 11 integrally united with such base portion and adapted for frictional engagement with the inner surface of the member 1. The facing 11, as shown in Fig. 3 terminates short of the sides of the base portion 10, and such base portion is formed to provide flanges 12, which, in the normal use of the unit, are interlocked with the flanges 9, as shown in Fig. 3.

The base portion 10 of the friction member is preferably formed of strip steel, and the facing 11 of bronze. The friction member can conveniently be formed from blanks cut from bimetallic strip, made by a process, such as is disclosed in Salzman Patent No. 2,031,795.

When one of these friction members 10—11 becomes worn, and requires replacement, it is only necessary to slide it endwise off the flanges 9, and to slide a new member onto the intermediate member 8 by a similar movement. In thus replacing the friction member, it is unnecessary to disturb either the shoe 5 or the intermediate member 8, or to dismantle the clutch to any appreciable extent.

The corrugations 8 provide openings or spaces 13, through which air may pass or be passed for the purpose of cooling the unit during use of the clutch.

Although the unit has been described as particularly adapted for clutches, it will be understood that it can be used just as effectively for brakes.

Figure 4:
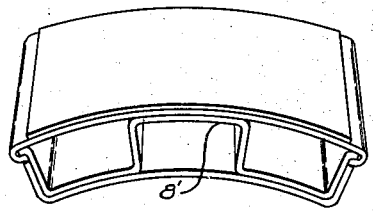
Fig. 4 is a view similar to Fig. 3, but showing a modified form of the friction unit.

In that form of the unit shown in Fig. 4, a single corrugation 8' is formed in the intermediate member, instead of two corrugations. In other respects this unit is substantially the same as that shown in Fig. 3.

It will be noted that the flanges 6, in each case, extend substantially to the flanges 12 of the base portion 10 of the friction member 4. This prevents the flanges 12 from spreading during use of the friction member.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:

1. A friction unit comprising an arcuate metallic shoe adapted for attachment to a pneumatic tire, an arcuate friction member having flanges at the ends thereof, and a spacing member interposed between said shoe and friction member, said spacing member having flanges which are interengaged with the flanges of said friction member.

2. A friction unit comprising an arcuate metallic shoe adapted for attachment to a pneumatic tire, an arcuate friction member having flanges at the ends thereof, and a corrugated spacing member interposed between said shoe and friction member, said spacing member having flanges which are interlocked with the flanges of said friction member.

3. A friction unit comprising an arcuate metallic shoe adapted for attachment to a pneumatic tire, said shoe having radially extending flanges at the ends thereof, and arcuate friction member having flanges at the ends thereof, and a spacing member interposed between said shoe and friction member, said spacing member having radially extending flanges in engagement with the flanges of said shoe and terminating in outturned ends which are interengaged with the flanges of said friction member.

4. A friction unit comprising an arcuate metallic shoe adapted for attachment to a pneumatic tire, said shoe having radially extending flanges at the ends thereof, an arcuate friction member, and a spacing member interposed between said shoe and friction member, said spacing member having radially extending flanges which lie flat against the flanges of the shoe.

5. A friction unit comprising an arcuate metallic shoe adapted for attachment to a pneumatic tire, an arcuate friction member having inturned flanges at the ends thereof, and a spacing member having out-turned flanges at its ends interengaging the flanges of said friction member, said spacing member being permanently secured to said shoe, and said friction member being removable from said spacing member by a movement lateral to the direction of curvature of the shoe and friction member.

WILLIAM H. KLOCKE.